US008527201B2

(12) United States Patent
Ueda et al.

(10) Patent No.: US 8,527,201 B2
(45) Date of Patent: Sep. 3, 2013

(54) AZIMUTH DETECTING DEVICE AND AZIMUTH DETECTING METHOD

(75) Inventors: Akihiro Ueda, Nagoya (JP); Iwao Maeda, Nagoya (JP); Kiyomi Nagamiya, Nissin (JP); Naoto Shibata, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/233,087

(22) Filed: Sep. 15, 2011

(65) Prior Publication Data

US 2012/0004843 A1 Jan. 5, 2012

Related U.S. Application Data

(62) Division of application No. 12/243,178, filed on Oct. 1, 2008, now Pat. No. 8,224,573.

(30) Foreign Application Priority Data

Oct. 2, 2007 (JP) ................................ 2007-259090

(51) Int. Cl.
*G01C 17/38* (2006.01)
(52) U.S. Cl.
USPC ............ 701/469; 701/530; 701/472; 701/468
(58) Field of Classification Search
USPC .................................. 701/468, 469, 472, 530
See application file for complete search history.

(56) References Cited

U.S. PATENT DOCUMENTS

| 4,743,913 | A | | 5/1988 | Takai |
| 5,179,519 | A | * | 1/1993 | Adachi et al. ................. 701/457 |
| 5,339,246 | A | | 8/1994 | Kao |
| 5,349,530 | A | * | 9/1994 | Odagawa ...................... 701/469 |
| 5,684,476 | A | * | 11/1997 | Anderson ..................... 340/988 |
| 5,796,613 | A | | 8/1998 | Kato et al. |
| 5,946,813 | A | * | 9/1999 | Nachbaur et al. ............... 33/357 |
| 6,014,610 | A | * | 1/2000 | Judge et al. ..................... 702/92 |

(Continued)

FOREIGN PATENT DOCUMENTS

| EP | 0 513 972 A2 | 11/1992 |
| EP | 0 522 861 A1 | 1/1993 |
| JP | 63-262518 | 10/1988 |
| JP | 5-18770 | 1/1993 |
| JP | 5-215564 | 8/1993 |

(Continued)

OTHER PUBLICATIONS

United States Office Action issued on Oct. 14, 2011 in U.S. Appl. No. 12/243,178.

*Primary Examiner* — Kaitlin Joerger
*Assistant Examiner* — Ernesto Suarez
(74) *Attorney, Agent, or Firm* — Oblon, Spivak, McClelland, Maier & Neustadt, L.L.P.

(57) ABSTRACT

An azimuth detecting device mounted in a mobile object and having: a geomagnetic sensor; GPS signal receiving means; and measuring means for measuring a position of the mobile object by using a GPS signal, the azimuth detecting device being characterized in calculating a gain correction amount by means of a method of least squares, using an output value of the geomagnetic sensor when a level of the GPS signal received by the GPS signal receiving means is lower than a predetermined level, and calculating a declination correction amount and/or an inclination correction amount on the basis of information obtained from the GPS signal and correcting the output value of the geomagnetic sensor, when the level of the GPS signal is at least the predetermined level.

6 Claims, 3 Drawing Sheets

(56) References Cited

U.S. PATENT DOCUMENTS

| | | |
|---|---|---|
| 6,166,686 A | 12/2000 | Lazar |
| 6,684,157 B2 * | 1/2004 | Barman et al. ............... 701/472 |
| 6,956,525 B1 | 10/2005 | Chang |
| 7,379,814 B2 * | 5/2008 | Ockerse et al. ............... 701/530 |
| 7,451,549 B1 * | 11/2008 | Sodhi et al. ............... 33/356 |
| 2011/0106449 A1 * | 5/2011 | Chowdhary et al. ............ 701/214 |

FOREIGN PATENT DOCUMENTS

| | | |
|---|---|---|
| JP | 9-304078 | 11/1997 |
| JP | 11-325904 | 11/1999 |
| JP | 2005-291933 | 10/2005 |
| JP | 2006-337333 | 12/2006 |
| JP | 2007-101354 | 4/2007 |
| WO | WO 2005/106391 A1 | 11/2005 |

* cited by examiner

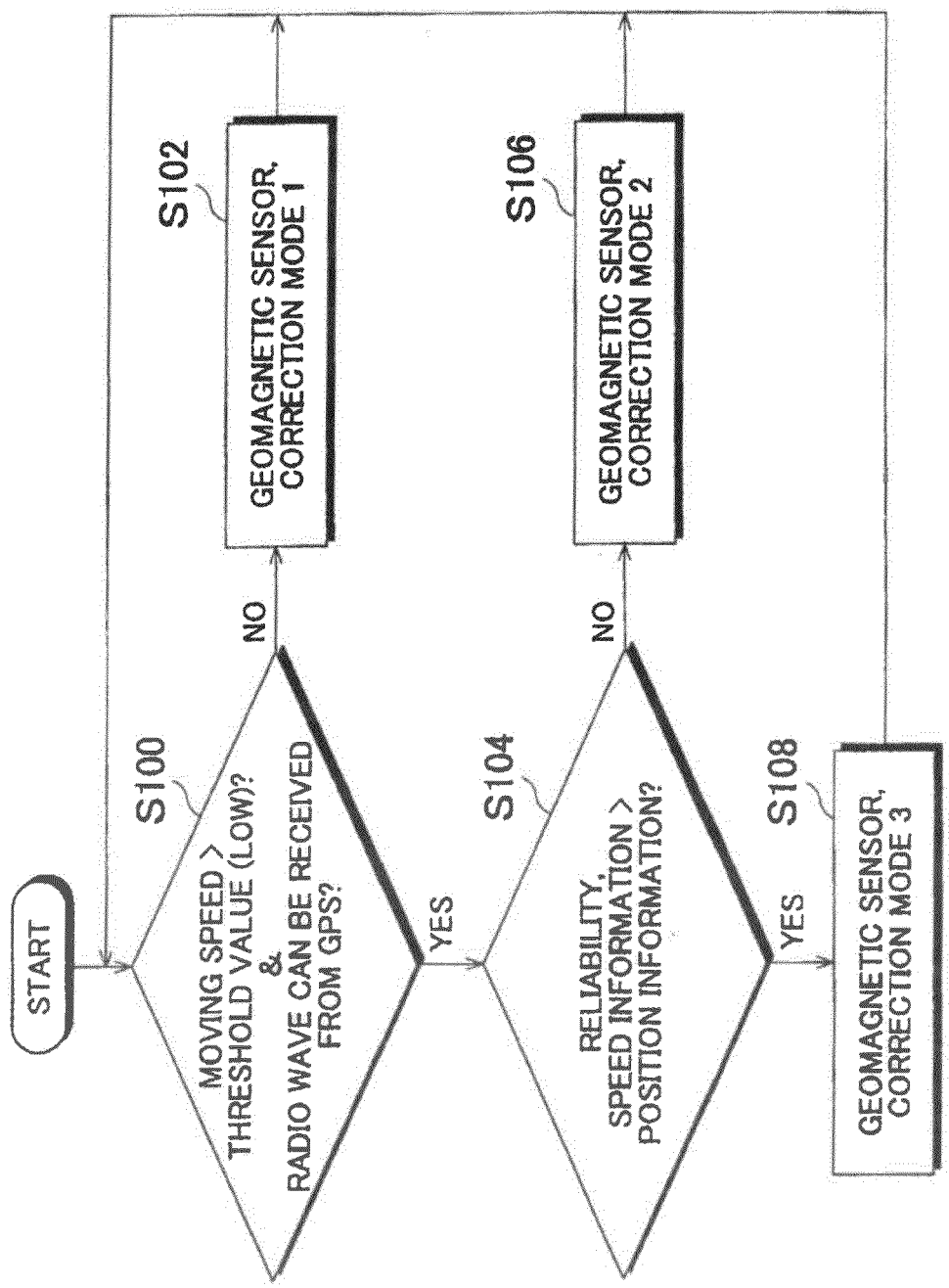

AZIMUTH DETECTING DEVICE AND AZIMUTH DETECTING METHOD

INCORPORATION BY REFERENCE

This application is a divisional application of U.S. application Ser. No. 12/243,178, filed Oct. 1, 2008, which claims priority under 35 U.S.C. 119 to Japanese Patent Application No. 2007-259090, filed Oct. 2, 2007. The disclosures of U.S. application Ser. No. 12/243,178 and Japanese Patent Application No. 2007-259090 including the specification, drawings and abstract are incorporated herein by reference in its entirety.

BACKGROUND OF THE INVENTION

1. Field of the Invention

This invention relates to an azimuth detecting device to be mounted in a mobile object and an azimuth detecting method.

2. Description of the Related Art

There has conventionally been known an azimuth detecting device having Global Positioning System (GPS) measuring means for receiving measuring radio waves from a GPS satellite to output first azimuth data, a geomagnetic sensor for outputting second azimuth data, storage means for storing the first azimuth data and second azimuth data in the preceding measurement timing, and correcting arithmetic means for obtaining true magnetic circle data on the geomagnetic sensor from the first azimuth data and second azimuth data in the preceding and present measurement timings so as to correct the geomagnetic sensor on the basis of the true magnetic circle data (see, for example, Japanese Patent Application Publication No. 5-18770 (JP-A-5-18770)).

The azimuth detecting device described in JP-A-5-18770, however, cannot correct the outputs of the geomagnetic sensor accurately because a gain fluctuation in the geomagnetic sensor and a fluctuation in geomagnetic declination and inclination are not taken into consideration.

SUMMARY OF THE INVENTION

Therefore, an object of the invention is to provide an azimuth detecting device capable of correcting the outputs of the geomagnetic sensor accurately, and an azimuth detecting method.

A first aspect of the invention is an azimuth detecting device mounted in a mobile object and having: a geomagnetic sensor; a GPS signal receiver; a measuring part that measures the position of the mobile object by using a GPS signal; and a controller that calculates a gain correction amount by means of a method of least squares, using an output value of the geomagnetic sensor when a level of the GPS signal received by the GPS signal receiver is lower than a predetermined level, and calculates a declination correction amount and/or an inclination correction amount on the basis of information obtained from the GPS signal and corrects the output value of the geomagnetic sensor, when the level of the GPS signal is at least the predetermined level.

In the azimuth detecting device according to the first aspect, when the level of the GPS signal is at least the predetermined level, the controller may compare reliability of position information of the mobile object with reliability of speed information of the mobile object, both information being obtained based on the GPS signal, to calculate the declination correction amount and/or the inclination correction amount based on the speed information when the reliability of the speed information is higher than the reliability of the position information, and to calculate the declination correction amount and/or the inclination correction amount based on the position information when the reliability of the position information is higher than the reliability of the speed information.

A second aspect of the invention is an azimuth detecting device that uses a geomagnetic sensor mounted in a mobile object, the azimuth detecting device having: a mobile object traveling azimuth calculation part that calculates a traveling azimuth of the mobile object on the basis of a radio wave received from a satellite; a calculation part that calculates a geomagnetic declination and/or a geomagnetic inclination on the basis of a relationship between the traveling azimuth calculated by the mobile object traveling azimuth calculation part and an output of the geomagnetic sensor; a correction part that corrects the output of the geomagnetic sensor by using the geomagnetic declination and/or the geomagnetic inclination calculated by the calculation part; and an azimuth calculation part that calculates an azimuth of the mobile object on the basis of an output of the correction part.

In the azimuth detecting device according to the second aspect that, when a speed of the mobile object is greater than a threshold value, the mobile object traveling azimuth calculation part may calculate the traveling azimuth of the mobile object on the basis of a Doppler frequency of the radio wave received from the satellite, and when the speed of the mobile object is smaller than the threshold value, the mobile object traveling azimuth calculation part may calculate the traveling azimuth of the mobile object on the basis of a difference between two positions of the mobile object that are measured at different times based on the radio wave received from the satellite.

According to the first or second aspect, an azimuth detecting device capable of accurately correcting the outputs of a geomagnetic sensor is obtained.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a flowchart showing an example of a method of switching between correction modes.

DETAILED DESCRIPTION OF EMBODIMENTS

Hereinafter, an embodiment of the invention is described with reference to the drawings.

Figure 1:
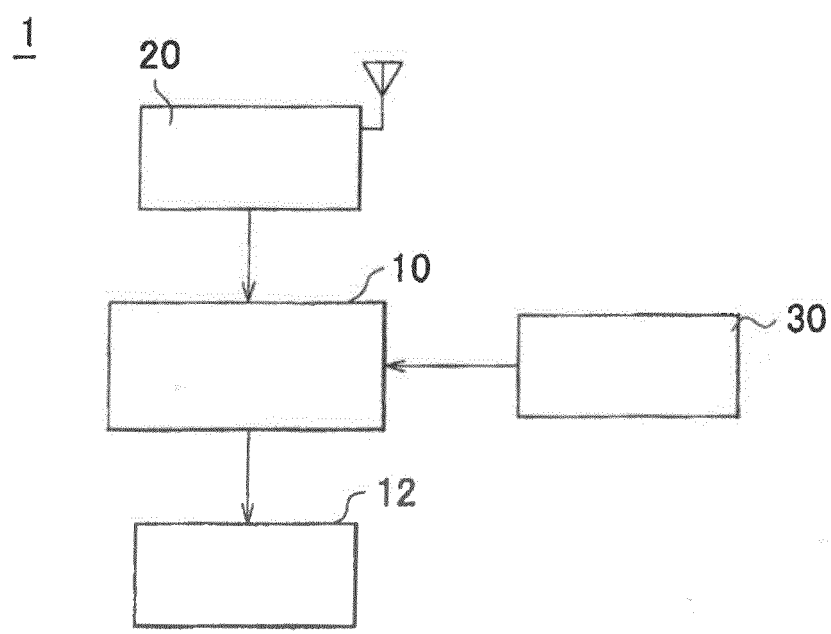
FIG. 1 is a schematic diagram showing a system configuration according to an embodiment of an azimuth detecting device of the invention.

FIG. 1 is a schematic diagram showing a system configuration according to an embodiment of an azimuth detecting device 1. The azimuth detecting device 1 of this embodiment is mounted in a mobile object, such as a vehicle, and detects an azimuth associated with the vehicle (typically a traveling azimuth). The vehicle is merely an example of the mobile object, and examples of another mobile object include a two-wheeled motor vehicle, a railway, a vessel, aircraft, a forklift, a robot, and an information terminal such as a cellular phone that moves as a person carrying it moves.

The azimuth detecting device 1 has a computing unit 10, memory 12, GPS receiver 20, and geomagnetic sensor (MI sensor) 30.

The computing unit 10 and memory 12 may be realized by microcomputers or may be incorporated in the GPS receiver 20. The memory 12 stores data and programs required for performing various computations described hereinafter.

The GPS receiver 20 has a computing unit (not shown) therein, and measures the position and speed of the vehicle, serving as the mobile object, on the basis of a satellite signal that is input via a GPS antenna. The vehicle position and vehicle speed may be measured by a so-called single measuring method or an interferometric positioning method (including the Differential Global Positioning System (DGPS)). Also, the measured vehicle position and vehicle speed may be corrected by matching them to map information. The vehicle speed may be calculated from a Doppler frequency (delta range) or calculated based on a difference between the results obtained by measuring the vehicle position twice at different times. Here, the vehicle position and vehicle speed are obtained based on latitude, longitude and height coordinate system (North-East-Down (NED)). In this manner, information on the vehicle position and vehicle speed calculated by the GPS receiver 20 (to be referred to as "vehicle position information" and "vehicle speed information," respectively, hereinafter) are stored in the memory 12 successively and then provided to the computing unit 10 in a manner described hereinafter. The vehicle position information and the vehicle speed information may be supplied to other system such as a navigation system.

Figure 2:
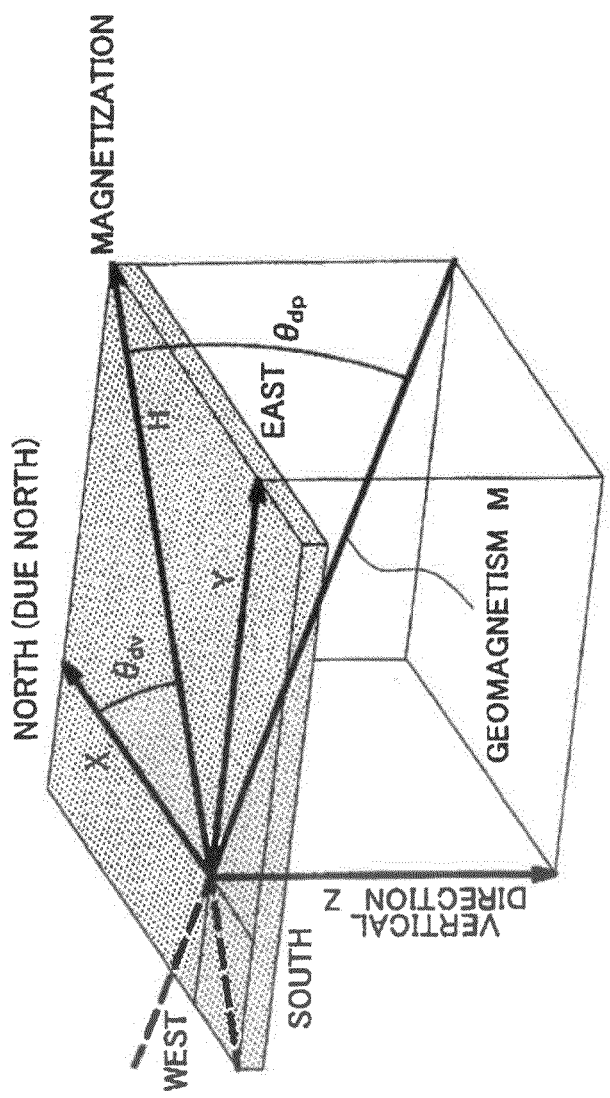
FIG. 2 is a diagram showing geomagnetic elements.

The geomagnetic sensor 30 detects a geomagnetic component from orthogonal three axes every predetermined cycle (sampling cycle). The geomagnetic sensor 30 may be configured by three sensors that are disposed perpendicularly to one another. Here, the geomagnetic sensor 30 detects the geomagnetic component based on latitude, longitude and height coordinate system (NED). However, because a geomagnetism has a declination $\theta_{dv}$, and inclination $\theta_{dp}$ with respect to the direction of due north, as shown in FIG. 2, sensor values of the geomagnetic sensor 30 contain such error components. The sensor values ($S_{rx}$, $S_{ry}$, $S_{rz}$) of the geomagnetic sensor 30 is successively stored in the memory 12 and then provided to the computing unit 10 in a manner described hereinafter.

The computing unit 10 uses the sensor values ($S_{rx}$, $S_{ry}$, $S_{rz}$) of the geomagnetic sensor 30 and the vehicle position information and vehicle speed information according to need, to correct an output of the geomagnetic sensor 30, and then derives an azimuth of the vehicle. As the correction method, there are several preferred methods as follows.

| Correction Mode | Summary | Features |
|---|---|---|
| Correction Mode 1-1 | Unknown quantities are taken as offsets ($C_{rx}$, $C_{ry}$, $C_{rz}$) and gain ($a_x$, $a_y$, $a_z$) and are statistically calculated from the sensor values ($S_{rx}$, $S_{ry}$, $S_{rz}$) by using a method of least squares. | Correction can be done without any external information. |
| Correction Mode 1-2 | Unknown quantities are taken as offsets and sensor values ($S_{rx}$, $S_{ry}$, $S_{rz}$). Data on a large residual error is deleted from residual errors obtained in the previous calculation, and correction using the method of least squares is performed again. | Correction can be done without any external information. Computation load is reduced because of low number of unknown quantities. |
| Correction Mode 2 | Declination amount, inclination amount, offsets, and sensor gains are calculated by the method of least squares on the basis of a traveling direction vector and a flux sensor value, which are all calculated from a differential value obtained when GPS measuring is performed. | Correction can be done with respect to due north. Good matching to map information. Have no impacts of declination and inclination, Correction can be done even when the speed of the mobile object is low. |
| Correction Mode 3-1 | The declination amount, offsets and sensor gains are calculated by the method of least squares on the basis of the traveling direction vector value and the flux sensor value, from the speed information obtained when GPS measuring is performed. | Correction can be done with respect to due north. Good matching to map information. Have no impacts of declination and inclination. Correction can be done with extremely high accuracy. |
| Correction Mode 3-2 | The inclination amount, offsets and sensor gains are calculated by the method of least squares on the basis of the traveling direction vector value and the flux sensor value, from the speed information obtained when GPS measuring is performed. | Correction can be done with respect to due north. Good matching to map information. Have no impacts of declination and inclination. Correction can be done with extremely high accuracy. |

Hereinafter, various correction methods described in this table are explained sequentially.

[Correction Method 1-1] In correction method 1-1, unknown quantities are taken as offsets ($C_{rx}$, $C_{ry}$, $C_{rz}$) and gains ($a_x$, $a_y$, $a_z$) of the respective axes of the geomagnetic sensor 30 as described in Table 1 above and the sensor values ($S_{rx}$, $S_{ry}$, $S_{rz}$) of the geomagnetic sensor 30 are used to statistically calculate the unknown quantities by means of the method of least squares. Specifically, the unknown quantities are calculated as follows. First, in correction method 1-1 the following relational expression is used.

$$\begin{cases} M_x = a_x \cdot S_{rx} + C_{rx} \\ M_y = a_y \cdot S_{ry} + C_{ry} \\ M_z = a_z \cdot S_{rz} + C_{rz} \end{cases} \quad [\text{E 1}]$$

$$M = \sqrt{M_x^2 + M_y^2 + M_z^2}$$

In the above equation, $M_x$, $M_y$, and $M_z$ are geomagnetic flux densities of a X-axis direction, Y-axis direction and Z-axis direction respectively, with M being a geomagnetic vector/scalar value. Here, a function ft is defined as follows.

$$f_t = M_x^2 + M_y^2 + M_z^2 - M^2 + \epsilon$$

In the above equation, ε represents an error. The function ft is partially differentiated by the unknown quantities as follows.

$$\Delta f_t = \frac{\partial f_t}{\partial a_x}\Delta a_x + \frac{\partial f_t}{\partial a_y}\Delta a_y + \frac{\partial f_t}{\partial a_z}\Delta a_z + \quad [\text{E 3}]$$

$$\frac{\partial f_t}{\partial C_{rx}}\Delta C_{rx} + \frac{\partial f_t}{\partial C_{ry}}\Delta C_{ry} + \frac{\partial f_t}{\partial C_{rz}}\Delta C_{rz} + \varepsilon$$

When a plurality of data sets (n data sets in this example) are prepared and generalized, the following relational expression is obtained.

$$\begin{bmatrix}\Delta f_1 \\ \Delta f_2 \\ \vdots \\ \Delta f_{n-1} \\ \Delta f_n\end{bmatrix} = \quad [\text{E 4}]$$

$$\begin{bmatrix}\frac{\partial f_1}{\partial a_x} & \frac{\partial f_1}{\partial a_y} & \frac{\partial f_1}{\partial a_z} & \frac{\partial f_1}{\partial C_{rx}} & \frac{\partial f_1}{\partial C_{ry}} & \frac{\partial f_1}{\partial C_{rz}} \\ \frac{\partial f_2}{\partial a_x} & \frac{\partial f_2}{\partial a_y} & \frac{\partial f_2}{\partial a_z} & \frac{\partial f_2}{\partial C_{rx}} & \frac{\partial f_2}{\partial C_{ry}} & \frac{\partial f_2}{\partial C_{rz}} \\ \vdots & \vdots & \vdots & \vdots & \vdots & \vdots \\ \frac{\partial f_{n-1}}{\partial a_x} & \frac{\partial f_{n-1}}{\partial a_y} & \frac{\partial f_{n-1}}{\partial a_z} & \frac{\partial f_{n-1}}{\partial C_{rx}} & \frac{\partial f_{n-1}}{\partial C_{ry}} & \frac{\partial f_{n-1}}{\partial C_{rz}} \\ \frac{\partial f_n}{\partial a_x} & \frac{\partial f_n}{\partial a_y} & \frac{\partial f_n}{\partial a_z} & \frac{\partial f_n}{\partial C_{rx}} & \frac{\partial f_n}{\partial C_{ry}} & \frac{\partial f_n}{\partial C_{rz}}\end{bmatrix}\begin{bmatrix}\Delta a_x \\ \Delta a_y \\ \Delta a_z \\ \Delta C_{rx} \\ \Delta C_{ry} \\ \Delta C_{rz}\end{bmatrix} + \varepsilon$$

$$\varepsilon = \begin{bmatrix}\varepsilon_{(1)} \\ \varepsilon_{(2)} \\ \vdots \\ \varepsilon_{(n-1)} \\ \varepsilon_{(n)}\end{bmatrix}$$

In the above expression, the line on the left-hand side, $[\Delta f_1, \Delta f_2, \ldots, \Delta f_{n-1}, \Delta f_n]^T$, is substituted with $\Delta MM$, the left side line on the right-hand side is substituted with A, and the right side line on the right-hand side, $[\Delta a_x, \Delta a_y, \Delta a_z, \Delta C_{rx}, \Delta C_{ry}, \Delta C_{rz}]^T$, is substituted with $\Delta X$, the following equation is obtained.

$$\varepsilon = \Delta MM - A\Delta X \quad [\text{E 5}]$$

Here, $$f = \varepsilon_{(1)}^2 + \varepsilon_{(2)}^2 + \ldots + \varepsilon_{(n-1)}^2 + \varepsilon_{(n)}^2 \quad [\text{E 6}]$$

The above equation is established, the following equation is obtained.

$$f = \varepsilon^T \varepsilon \quad [\text{E 7}]$$

In order to obtain $\Delta X$ with the minimum error-square sum function f, f is partially differentiated by $\Delta X$ to obtain $\Delta X$ where a partial derivative value=0. Specifically, the correction value $\Delta X$ is obtained by the following equation.

$$\Delta X = \frac{A^T \Delta MM}{A^T A} \quad [\text{E 8}]$$

Then, the unknown quantity $X=[a_x, a_y, a_z, C_{rx}, C_{ry}, C_{rz}]^T$ is obtained as follows.

$$X = X_{old} + \Delta X \quad [\text{E 9}]$$

In the above equation, $X_{old}$ is a value obtained before correction. The unknown quantity X may be calculated repeatedly until the solution converges. The derived unknown quantity X is substituted into the above Equation 1 to calculate the geomagnetic flux densities ($M_x$, $M_y$, $M_z$) again, whereby an azimuth angle is calculated.

According to correction method 1-1, the offsets (sensor zero point, drift) and gains of outputs of the geomagnetic sensor 30 can be corrected even when the vehicle position information, vehicle speed information or other external information is not available. Moreover, because the offsets and gains on the respective axes of the geomagnetic sensor 30 are estimated and corrected individually, accurate correction can be realized as compared to a method of assuming the offsets and gains on the respective axes of the geomagnetic sensor 30 are all the same.

[Correction Method 1-2] In correction method 1-2, unknown quantities are taken as the offsets ($C_{rx}$, $C_{ry}$, $C_{rz}$) of the respective axes of the geomagnetic sensor 30 as described in Table 1 above and the sensor values ($S_{rx}$, $S_{ry}$, $S_{rz}$) of the geomagnetic sensor 30 are used to statistically calculate the unknown quantities by means of the method of least squares. In so doing, data in which a residual error is greater than a predetermined value is discarded in consideration of residual errors obtained in previous calculations, and thereafter the unknown quantities are statistically calculated again by the method of least squares. Specifically, the unknown quantities are calculated as follows. First, in correction method 1-2 the following relational expression is used. The meanings of the symbols used in this method are the same as those used in correction method 1-1.

$$\begin{cases}M_x = (S_{rx} + C_{rx}) \\ M_y = (S_{ry} + C_{ry}) \\ M_z = (S_{rz} + C_{rz})\end{cases} \quad [\text{E 10}]$$

$$M = \sqrt{M_x^2 + M_y^2 + M_z^2}$$

Here, the function ft is defined as follows.

$$f_t = M_x^2 + M_y^2 + M_z^2 - M^2 + \epsilon \quad \text{[E 11]}$$

The function ft is partially differentiated by the unknown quantities as follows.

$$\Delta f_t = \frac{\partial f_t}{\partial C_{rx}} \Delta C_{rx} + \frac{\partial f_t}{\partial C_{ry}} \Delta C_{ry} + \frac{\partial f_t}{\partial C_{rz}} \Delta C_{rz} + \varepsilon \quad \text{[E 12]}$$

When a plurality of data sets (n data sets in this example) are prepared and generalized, the following relational expression is obtained.

$$\begin{bmatrix} \Delta f_1 \\ \Delta f_2 \\ \vdots \\ \Delta f_{n-1} \\ \Delta f_n \end{bmatrix} = \begin{bmatrix} \frac{\partial f_1}{\partial C_{rx(1)}} & \frac{\partial f_1}{\partial C_{ry(1)}} & \frac{\partial f_1}{\partial C_{rz(1)}} \\ \frac{\partial f_2}{\partial C_{rx(2)}} & \frac{\partial f_2}{\partial C_{ry(2)}} & \frac{\partial f_2}{\partial C_{rz(2)}} \\ \vdots & \vdots & \vdots \\ \frac{\partial f_{n-1}}{\partial C_{rx(n-1)}} & \frac{\partial f_{n-1}}{\partial C_{ry(n-1)}} & \frac{\partial f_{n-1}}{\partial C_{rz(n-1)}} \\ \frac{\partial f_n}{\partial C_{rx(n)}} & \frac{\partial f_n}{\partial C_{ry(n)}} & \frac{\partial f_n}{\partial C_{rz(n)}} \end{bmatrix} \begin{bmatrix} \Delta C_{rx} \\ \Delta C_{ry} \\ \Delta C_{rz} \end{bmatrix} + \varepsilon \quad \text{[E 13]}$$

-continued $$\varepsilon = \begin{bmatrix} \varepsilon_{(1)} \\ \varepsilon_{(2)} \\ \vdots \\ \varepsilon_{(n-1)} \\ \varepsilon_{(n)} \end{bmatrix}$$

In this manner, the geomagnetic flux densities ($M_x$, $M_y$, $M_y$) are recalculated and the azimuth is obtained by performing the same calculation as correction method 1-1. However, the residual error is evaluated once the unknown quantities $X = [C_{rx}, C_{ry}, C_{rz}]^T$ are obtained. When the residual error is greater than the predetermined value, the larger data sets may be discarded, and the unknown quantities may be statistically calculated again by the method of least squares.

According to this correction method 1-2, as with correction method 1-1, the offsets and gains of outputs of the geomagnetic sensor 30 can be corrected even when the vehicle position information, vehicle speed information or other external information is not available. Moreover, because the number of unknown quantities is smaller in correction method 1-2 than correction method 1-1, the computation load can be reduced.

[Correction Method 2] In correction method 2, as described in Table 1, the unknown quantities are taken as the offsets ($C_{rx}$, $C_{ry}$, $C_{rz}$), gains ($a_x$, $a_y$, $a_z$), declination $\theta_{dv}$ and inclination $\theta_{dp}$ of respective axes of the geomagnetic sensor 30 and then these unknown quantities are statistically calculated by the method of least squares by using the vehicle speed information obtained from the GPS receiver 20, i.e., traveling direction vector values ($V_n$, $V_e$, $V_d$), as well as the sensor values of the geomagnetic sensor 30 ($S_{rx}$, $S_{ry}$, $S_{rz}$). In correction method 2, the traveling direction vector values ($V_n$, $V_e$, $V_d$) are obtained as differential vectors between the positions of the vehicle ($N_u(i-1)$, $E_u(i-1)$, $D_u(i-1)$) that are measured in the previous measuring cycle and the positions of the vehicle ($N_u(i)$, $E_u(i)$, $D_u(i)$) that are obtained in the present cycle. In other words, the traveling direction vector values are calculated as ($V_n$, $V_e$, $V_d$)=($N_u(i)-N_u(i-1)$, $E_u(i)-E_u(i-1)$, $D_u(i)-D_u(i-1)$).

Specifically, correction method 2 is shown below. First, the following relational expression is used in correction method 2.

$$\begin{cases} \begin{bmatrix} M_x \\ M_y \\ M_z \end{bmatrix} = \frac{\sqrt{M_x^2 + M_y^2 + M_z^2}}{\sqrt{V_n^2 + V_e^2 + V_d^2}} \begin{bmatrix} \cos(\theta_{dv})\cos(\theta_{dp}) & \sin(\theta_{dv})\cos(\theta_{dp}) & -\sin(\theta_{dv}) \\ -\sin(\theta_{dv}) & \cos(\theta_{dv}) & 0 \\ \cos(\theta_{dv})\sin(\theta_{dp}) & \sin(\theta_{dv})\sin(\theta_{dp}) & \cos(\theta_{dp}) \end{bmatrix} \begin{bmatrix} V_n \\ V_e \\ V_d \end{bmatrix} \\ M_x = a_x S_{rx} + C_{rx} \\ M_y = a_y S_{ry} + C_{ry} \\ M_z = a_z S_{rz} + C_{rz} \end{cases} \quad \text{[E 14]}$$

$$M = \sqrt{M_x^2 + M_y^2 + M_z^2}$$

Note that the meanings of the symbols used in this method are the same as those used in correction method 1-1. Here, the function ft is defined and partially differentiated by the unknown quantities in the same manner as defined in correction method 1-1 described above. This is shown below.

$$\Delta f_t = \frac{\partial f_t}{\partial a_x} \Delta a_x + \frac{\partial f_t}{\partial a_y} \Delta a_y + \frac{\partial f_t}{\partial a_z} \Delta a_z + \frac{\partial f_t}{\partial C_{rx}} \Delta C_{rx} + \quad \text{[E 15]}$$

$$\frac{\partial f_t}{\partial C_{ry}} \Delta C_{ry} + \frac{\partial f_t}{\partial C_{rz}} \Delta C_{rz} + \frac{\partial f_t}{\partial \theta_{dv}} \Delta \theta_{dv} + \frac{\partial f_t}{\partial \theta_{dp}} \Delta \theta_{dp}$$

When a plurality of data sets (n data sets in this example) are prepared and generalized, the following relational expression is obtained.

$$\begin{bmatrix} \Delta f_1 \\ \Delta f_2 \\ \vdots \\ \Delta f_{n-1} \\ \Delta f_n \end{bmatrix} = \begin{bmatrix} \frac{\partial f_1}{\partial a_{x(1)}} & \frac{\partial f_1}{\partial a_{y(1)}} & \frac{\partial f_1}{\partial a_{z(1)}} & \frac{\partial f_1}{\partial C_{rx(1)}} & \frac{\partial f_1}{\partial C_{ry(1)}} & \frac{\partial f_1}{\partial C_{rz(1)}} & \frac{\partial f_1}{\partial \theta_{dv(1)}} & \frac{\partial f_1}{\partial \theta_{dp(1)}} \\ \frac{\partial f_2}{\partial a_{x(2)}} & \frac{\partial f_2}{\partial a_{y(2)}} & \frac{\partial f_2}{\partial a_{z(2)}} & \frac{\partial f_2}{\partial C_{rx(2)}} & \frac{\partial f_2}{\partial C_{ry(2)}} & \frac{\partial f_2}{\partial C_{rz(2)}} & \frac{\partial f_2}{\partial \theta_{dv(2)}} & \frac{\partial f_2}{\partial \theta_{dp(2)}} \\ \vdots & \vdots & \vdots & \vdots & \vdots & \vdots & \vdots & \vdots \\ \frac{\partial f_{n-1}}{\partial a_{x(n-1)}} & \frac{\partial f_{n-1}}{\partial a_{y(n-1)}} & \frac{\partial f_{n-1}}{\partial a_{z(n-1)}} & \frac{\partial f_{n-1}}{\partial C_{rx(n-1)}} & \frac{\partial f_{n-1}}{\partial C_{ry(n-1)}} & \frac{\partial f_{n-1}}{\partial C_{rz(n-1)}} & \frac{\partial f_{n-1}}{\partial \theta_{dv(n-1)}} & \frac{\partial f_{n-1}}{\partial \theta_{dp(n-1)}} \\ \frac{\partial f_n}{\partial a_{x(n)}} & \frac{\partial f_n}{\partial a_{y(n)}} & \frac{\partial f_n}{\partial a_{z(n)}} & \frac{\partial f_n}{\partial C_{rx(n)}} & \frac{\partial f_n}{\partial C_{ry(n)}} & \frac{\partial f_n}{\partial C_{rz(n)}} & \frac{\partial f_n}{\partial \theta_{dv(n)}} & \frac{\partial f_n}{\partial \theta_{dp(n)}} \end{bmatrix} \begin{bmatrix} \Delta a_x \\ \Delta a_y \\ \Delta a_z \\ \Delta C_{rx} \\ \Delta C_{ry} \\ \Delta C_{rz} \\ \Delta \theta_{dv} \\ \Delta \theta_{dp} \end{bmatrix} + \varepsilon \quad [\text{E 16}]$$

$$\varepsilon = \begin{bmatrix} \varepsilon_{(1)} \\ \varepsilon_{(2)} \\ \vdots \\ \varepsilon_{(n-1)} \\ \varepsilon_{(n)} \end{bmatrix}$$

In this manner, the geomagnetic flux densities ($M_x$, $M_y$, $M_y$) are recalculated and the azimuth is obtained by performing the same calculation as correction method 1-1. Also, similarly, in the course of solution convergence, the residual errors are evaluated, and when the residual error is greater than the predetermined value the larger data sets may be discarded, and the unknown quantities may be statistically calculated again by the method of least squares. In correction method 2, the azimuth is corrected based on the obtained declination $\theta_{dv}$ and inclination $\theta_{dp}$ because the declination $\theta_{dv}$, and inclination $\theta_{dp}$ are taken as the unknown qualities. More specifically, the azimuth is obtained using due north as a reference.

According to this correction method 2, correction can be done with respect to due north because the declination $\theta_{dv}$, and inclination $\theta_{dp}$ are taken into consideration. Therefore, the measured vehicle position and vehicle speed can be suitably matched with map information that is normally created with reference to due north (instead of magnetic north). Moreover, because the declination $\theta_{dv}$ and inclination $\theta_{dp}$ are taken into consideration, the azimuth can be calculated accurately without the impacts of the declination $\theta_{ds}$ and inclination $\theta_{dp}$ that might be different depending on the areas (for example, even in Japan's main island the declination varies by approximately 2.5° and the inclination by approximately 8°). In addition, correction can be performed even if the vehicle speed is low, because the traveling direction vector values that are resulted from the differences among the measurement results are used (this is described hereinafter).

[Correction Method 3] In correction method 3, as described in Table 1, the unknown quantities are taken as the offsets ($C_{rx}$, $C_{ry}$, $C_{rz}$), gains ($a_z$, $a_y$, $a_z$), declination $\theta_{dv}$, and inclination $\theta_{dp}$ of respective axes of the geomagnetic sensor 30 and then these unknown quantities are statistically calculated by the method of least squares by using the vehicle speed information obtained from the GPS receiver 20, i.e., the traveling direction vector values ($V_n$, $V_e$, $V_d$), as well as the sensor values of the geomagnetic sensor 30 ($S_{rx}$, $S_{ry}$, $S_{rz}$). In correction method 3, the traveling direction vector values ($V_n$, $V_e$, $V_d$) are calculated from measurement values of Doppler frequencies of carrier waves received from a GPS satellite. A method of calculating the traveling direction vector values from the Doppler frequencies is not described in detail herein, as it is a known method (for example, see the 86th page of the first copy of "New Basics of GPS Measurement" published by Japanese Association of Surveyors on Oct. 1, 2002).

Specifically, correction method 3 is shown below. First, the following relational expression is used in correction method 3.

$$\begin{cases} \begin{bmatrix} M_x \\ M_y \\ M_z \end{bmatrix} = \frac{\sqrt{M_x^2 + M_y^2 + M_z^2}}{\sqrt{V_n^2 + V_e^2 + V_d^2}} \begin{bmatrix} \cos(\theta_{dv})\cos(\theta_{dp}) & \sin(\theta_{dv})\cos(\theta_{dp}) & -\sin(\theta_{dv}) \\ -\sin(\theta_{dv}) & \cos(\theta_{dv}) & 0 \\ \cos(\theta_{dv})\sin(\theta_{dp}) & \sin(\theta_{dv})\sin(\theta_{dp}) & \cos(\theta_{dp}) \end{bmatrix} \begin{bmatrix} V_n \\ V_e \\ V_d \end{bmatrix} \\ M_x = a_x S_{rx} + C_{rx} \\ M_y = a_y S_{ry} + C_{ry} \\ M_z = a_z S_{rz} + C_{rz} \end{cases} \quad [\text{E 17}]$$

$$M = \sqrt{M_x^2 + M_y^2 + M_z^2}$$

The meanings of the symbols used in this method are the same as those used in correction method 1-1. Here, the function ft is defined and partially differentiated by the unknown quantities in the same manner as defined in correction method 1-1 described above. This is shown below.

$$\Delta f_t = \frac{\partial f_t}{\partial a_x}\Delta a_x + \frac{\partial f_t}{\partial a_y}\Delta a_y + \frac{\partial f_t}{\partial a_z}\Delta a_z + \frac{\partial f_t}{\partial C_{rx}}\Delta C_{rx} + \frac{\partial f_t}{\partial C_{ry}}\Delta C_{ry} + \frac{\partial f_t}{\partial C_{rz}}\Delta C_{rz} + \frac{\partial f_t}{\partial \theta_{dv}}\Delta \theta_{dv} + \frac{\partial f_t}{\partial \theta_{dp}}\Delta \theta_{dp} \quad [\text{E 18}]$$

When a plurality of data sets (n data sets in this example) are prepared and generalized, the following relational expression is obtained.

$$\begin{bmatrix} \Delta f_1 \\ \Delta f_2 \\ \vdots \\ \Delta f_{n-1} \\ \Delta f_n \end{bmatrix} = \begin{bmatrix} \frac{\partial f_1}{\partial a_{x(1)}} & \frac{\partial f_1}{\partial a_{y(1)}} & \frac{\partial f_1}{\partial a_{z(1)}} & \frac{\partial f_1}{\partial C_{rx(1)}} & \frac{\partial f_1}{\partial C_{ry(1)}} & \frac{\partial f_1}{\partial C_{rz(1)}} & \frac{\partial f_1}{\partial \theta_{dv(1)}} & \frac{\partial f_1}{\partial \theta_{dp(1)}} \\ \frac{\partial f_2}{\partial a_{x(2)}} & \frac{\partial f_2}{\partial a_{y(2)}} & \frac{\partial f_2}{\partial a_{z(2)}} & \frac{\partial f_2}{\partial C_{rx(2)}} & \frac{\partial f_2}{\partial C_{ry(2)}} & \frac{\partial f_2}{\partial C_{rz(2)}} & \frac{\partial f_2}{\partial \theta_{dv(2)}} & \frac{\partial f_2}{\partial \theta_{dp(2)}} \\ \vdots & \vdots & \vdots & \vdots & \vdots & \vdots & \vdots & \vdots \\ \frac{\partial f_{n-1}}{\partial a_{x(n-1)}} & \frac{\partial f_{n-1}}{\partial a_{y(n-1)}} & \frac{\partial f_{n-1}}{\partial a_{z(n-1)}} & \frac{\partial f_{n-1}}{\partial C_{rx(n-1)}} & \frac{\partial f_{n-1}}{\partial C_{ry(n-1)}} & \frac{\partial f_{n-1}}{\partial C_{rz(n-1)}} & \frac{\partial f_{n-1}}{\partial \theta_{dv(n-1)}} & \frac{\partial f_{n-1}}{\partial \theta_{dp(n-1)}} \\ \frac{\partial f_n}{\partial a_{x(n)}} & \frac{\partial f_n}{\partial a_{y(n)}} & \frac{\partial f_n}{\partial a_{z(n)}} & \frac{\partial f_n}{\partial C_{rx(n)}} & \frac{\partial f_n}{\partial C_{ry(n)}} & \frac{\partial f_n}{\partial C_{rz(n)}} & \frac{\partial f_n}{\partial \theta_{dv(n)}} & \frac{\partial f_n}{\partial \theta_{dp(n)}} \end{bmatrix} \begin{bmatrix} \Delta a_x \\ \Delta a_y \\ \Delta a_z \\ \Delta C_{rx} \\ \Delta C_{ry} \\ \Delta C_{rz} \\ \Delta \theta_{dv} \\ \Delta \theta_{dp} \end{bmatrix} + \varepsilon \quad [\text{E 19}]$$

$$\varepsilon = \begin{bmatrix} \varepsilon_{(1)} \\ \varepsilon_{(2)} \\ \vdots \\ \varepsilon_{(n-1)} \\ \varepsilon_{(n)} \end{bmatrix}$$

In this manner, the geomagnetic flux densities ($M_x$, $M_y$, $M_y$) are recalculated and the azimuth is obtained by performing the same calculation as correction method 1-1. Also, similarly, in the course of solution convergence, the residual errors are evaluated, and when the residual error is greater than the predetermined value the larger data sets may be discarded, and the unknown quantities may be statistically calculated. In correction method 3, the azimuth is corrected based on the obtained declination $\theta_{dv}$ and inclination $\theta_{dp}$ because the declination $\theta_{dv}$, and inclination $\theta_{dp}$ are taken as the unknown qualities. More specifically, the azimuth is obtained using due north as a reference.

According to this correction method 3, correction can be done with respect to due north because the declination $\theta_{dv}$ and inclination $\theta_{dp}$ are taken into consideration. Therefore, the measured vehicle position and vehicle speed can be suitably matched with map information that is normally created with reference to due north (instead of magnetic north). Moreover, because the declination $\theta_{ds}$ and inclination $\theta_{dp}$ are taken into consideration, the azimuth can be calculated accurately without the impacts of the declination $\theta_{dv}$, and inclination $\theta_{dp}$ that might be different depending on the areas. In addition, correction can be performed with extremely high accuracy because the traveling direction vector values that are resulted from the observations of the Doppler frequencies are used.

Note in correction method 3 (and correction method 2) described above that both of the declination $\theta_{dv}$, and inclination $\theta_{dp}$ are estimated to be the unknown quantities, but only one of the declination $\theta_{dv}$, and inclination $\theta_{dp}$ can be estimated (i.e., the unknown quantities are reduced). Moreover, in correction method 3 (and correction method 2) described above, other unknown quantities can also be reduced in the same manner as performed in correction method 1-2 described above.

Next, a preferred method of switching between the above-described various correction methods is described with reference to FIG. 3.

FIG. 3 is a flowchart showing an example of a method of switching between correction modes realized by the computing unit 10.

In step 100, it is determined whether moving speed of the vehicle is higher than a predetermined threshold value Th1 and whether radio waves can be received from a required number of GPS satellites by the GPS receiver 20. The moving speed of the vehicle may be detected by an in-vehicle sensor, such as a wheel speed sensor, or may be determined based on information obtained from the GPS receiver 20 (e.g., vehicle speed information). The predetermined threshold value Th1 may be a relatively small value that falls within a range of, for example, 1 to 10 km/h. Whether the radio waves can be received from the GPS satellites or not may be determined by determining whether the level of each received radio wave is at least a predetermined value. The number of required GPS satellites is three when performing, for example, single measurement, or preferably at least four when eliminating the clock errors. In step 100, when the above two conditions are both satisfied the processing advances to step 104, and when at least one of the conditions is satisfied the processing advances to step 102.

In step 102, a correction mode 1 of the geomagnetic sensor 30 is realized by the computing unit 10 by means of the above-described correction method 1-1 or 1-2. The reason is that correction can be performed without required any external information from the GPS receiver 20, when the above correction method 1-1 or 1-2 is used. Another reason is that, even when the radio waves can be received from the GPS satellites, the accuracy of the correction methods 2 and 3 are worsened as long as the vehicle speed of the vehicle is extremely low, and therefore, the use of correction methods 2 and 3 are not appropriate.

In step 104, the reliability of the vehicle position information and the reliability of the vehicle speed information are compared with each other, the both information being acquirable from the GPS receiver 20. When the reliability of the vehicle speed information is higher than the reliability of the vehicle position information the processing advances to step 108, and otherwise the processing advances to step 106. The reliability of the vehicle position information and the reliability of the vehicle speed information may be evaluated based on, for example, the moving speed of the vehicle. For example, when the moving speed of the vehicle is higher than a predetermined threshold value Th2 (>predetermined threshold value Th1), it is determined that the reliability of the vehicle speed information is higher than the reliability of the vehicle position information. When the moving speed of the vehicle is the predetermined threshold value Th2 or lower, it may be determined that the reliability of the vehicle position information is higher than the reliability of the vehicle speed information. The reason is that the higher the moving speed of the vehicle becomes, the higher the accuracy of the Doppler frequencies to be measured and/or the reliability of the vehicle speed information becomes. Another reason is that the accuracy of measuring the vehicle position is relatively high in a region where the moving speed of the vehicle is not too high. The predetermined threshold value Th2 may be a lower than, for example, 20 km/h or any appropriate value that is greater than the threshold value Th1.

In step 106, a correction mode 2 of the geomagnetic sensor 30 is realized by the computing unit 10 by means of the above-described correction method 2.

In step 108, a correction mode 3 of the geomagnetic sensor 30 is realized by the computing unit 10 by means of the above-described correction method 3.

According to the switching method shown in FIG. 3, the geomagnetic sensor 30 can appropriately switch between the above-described three types of methods to realize correction using an appropriate correction method in a coordinated way. For example, under a circumstance where highly reliable vehicle speed information can be obtained from the GPS receiver 20 because the moving speed of the vehicle is relatively high, accurate correction can be realized by the correction mode 3 using such highly reliable vehicle speed information. Moreover, under a circumstance where highly reliable vehicle speed information cannot be obtained from the GPS receiver 20 because the moving speed of the vehicle is relatively low, accurate correction can be realized by the correction mode 2 using the relatively highly reliable vehicle position information. In addition, under a circumstance where the highly reliable vehicle speed information and vehicle position information cannot be obtained because the moving speed of the vehicle is extremely low, correction can be realized by the correction mode 1 using only the sensor values of the geomagnetic sensor 30 (without using the information received from the GPS receiver 20).

The above has described the preferred embodiments of the invention, but the invention is not limited to these embodiments, and various modifications and changes can be made to these embodiments within the scope of the invention.

For example, the above embodiments have described an example in which the invention is applied to a GPS, but the invention can be applied to a satellite system other than the GPS, such as a Global Navigation Satellite System (GNSS) called Galileo.

What is claimed is:

1. An azimuth detecting device mounted in a mobile object, comprising:
    a geomagnetic sensor;
    a GPS signal receiver;
    a measuring part that measures a position of the mobile object by using a GPS signal; and
    a controller that statistically calculates a gain correction amount by means of a method of least squares, using an output value of the geomagnetic sensor when a level of the GPS signal received by the GPS signal receiver is lower than a predetermined level, and statistically calculates a declination correction amount and/or an inclination correction amount by means of a method of least squares on the basis of information obtained from the GPS signal, and corrects the output value of the geomagnetic sensor based on the calculated geomagnetic inclination correction amount and/or the calculated geomagnetic declination correction amount when the level of the GPS signal is at least the predetermined level.

2. The azimuth detecting device according to claim 1, wherein when the level of the GPS signal is at least the predetermined level, the controller compares reliability of position information of the mobile object with reliability of speed information of the mobile object, both information being obtained based on the GPS signal and the reliability of the position information and the speed information being determined based on a speed of the mobile object, calculates the declination correction amount and/or the inclination correction amount based on the speed information when the reliability of the speed information is higher than the reliability of the position information, and calculates the declination correction amount and/or the inclination correction amount based on the position information when the reliability of the position information is higher than the reliability of the speed information.

3. The azimuth detecting device according to claim 2, wherein the controller determines that the reliability of the speed information is higher than the reliability of the position information when the speed of the mobile object is higher than a predetermined threshold value.

4. The azimuth detecting device according to claim 2, wherein the controller determines that the reliability of the position information is higher than the reliability of the speed information when the speed of the mobile object is equal to or lower than a predetermined threshold value.

5. The azimuth detecting device according to claim 1, wherein the gain correction amount is calculated individually for respective axis of the geomagnetic sensor.

6. An azimuth detecting method, comprising the steps of:

receiving an output value of a geomagnetic sensor;

receiving, by a GPS signal receiver, a GPS signal that is used for measuring a position of a mobile object;

calculating a gain correction amount, using a processor, by means of a method of least squares by using the output value of the geomagnetic sensor and correcting the output value of the geomagnetic sensor when a level of the GPS signal is lower than a predetermined value; and calculating a declination correction amount and/or an inclination correction amount by means of a method of least squares on the basis of information received from the GPS signal and correcting the output value of the geomagnetic sensor based on the calculated geomagnetic inclination correction amount and/or the calculated geomagnetic declination correction amount when the level of the GPS signal is at least the predetermined level.

* * * * *